(12) United States Patent
Tan et al.

(10) Patent No.: US 9,402,148 B1
(45) Date of Patent: Jul. 26, 2016

(54) LOOP BACK SCHEME FOR NFC

(71) Applicant: MediaTek Singapore Pte, Ltd., Singapore (SG)

(72) Inventors: Ying Chow Tan, Singapore (SG); Tieng Ying Choke, Singapore (SG); Yuan Sun, Singapore (SG); Osama K A Shana'a, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/200,026

(22) Filed: Mar. 7, 2014

Related U.S. Application Data

(60) Provisional application No. 61/826,748, filed on May 23, 2013.

(51) Int. Cl.
 *H04B 5/00* (2006.01)
 *H04B 17/00* (2015.01)
 *H04W 4/00* (2009.01)

(52) U.S. Cl.
 CPC ..................................... *H04W 4/008* (2013.01)

(58) Field of Classification Search
 CPC .......... H04B 5/00; H04B 5/062; H04B 17/00; H04B 17/0085
 USPC ......... 455/41.1, 41.2, 67.11, 67.14, 333, 423, 455/425
 See application file for complete search history.

(56) References Cited

U.S. PATENT DOCUMENTS

| | | | |
|---|---|---|---|
| 6,400,173 B1 * | 6/2002 | Shimizu et al. | 324/754.07 |
| 7,269,772 B1 * | 9/2007 | Li et al. | 714/733 |
| 7,795,895 B2 * | 9/2010 | Hsieh et al. | 324/762.02 |
| 8,694,276 B2 * | 4/2014 | Sontakke et al. | 702/119 |
| 9,020,424 B2 * | 4/2015 | Lefley | 455/41.1 |
| 9,041,421 B2 * | 5/2015 | Peng et al. | 324/750.01 |
| 2009/0134903 A1 | 5/2009 | Hsieh | |

* cited by examiner

*Primary Examiner* — Quochien B Vuong
(74) *Attorney, Agent, or Firm* — Winston Hsu; Scott Margo

(57) ABSTRACT

A method for testing an Integrated Circuit (IC) with Near Field Communication (NFC) technology according to a first embodiment of the present invention includes: utilizing a BB modem of the IC to generate a known data pattern; modulating the known data pattern to generate a modulated data pattern; sending the modulated data pattern on the transmitting path to an NFC antenna of the IC and utilizing the NFC antenna to loop the modulated data pattern back to the receiving path; demodulating the modulated data pattern; and determining if the data pattern on the transmitting path is the same as the data pattern on the receiving path. When the data pattern on the transmitting path is not the same as the data pattern on the receiving path, it is determined that the IC fails.

6 Claims, 3 Drawing Sheets

LOOP BACK SCHEME FOR NFC

CROSS REFERENCE TO RELATED APPLICATIONS

This application claims the benefit of U.S. Provisional Application No. 61/826,748, which was filed on May 23, 2013.

BACKGROUND

Near field communication (NFC) is a standards-based communication technology which enables communication between different electronic devices over a short-range distance, ranging from direct contact to a few centimeters. Devices equipped with NFC can make transactions and transmit and receive digital content simply and quickly, without requiring pairing codes or searching for wireless networks. NFC has already been implemented in Android-supported smart phones and tablets, credit cards and transportation systems, and even has the potential to replace passports in the future.

Please refer to FIG. 1, which is a diagram of an integrated circuit (IC) 100 which uses NFC technology. As illustrated in the diagram, the IC 100 is coupled to a PC/phone host 150. The integrated circuit 100 comprises a BB modem 110, which contains a power estimation Fast Fourier Transform (FFT) circuit 103, a digital FE circuit 105 and a CW/modulated circuit 107. A first analog-to-digital converter (ADC) 113 and a second ADC 115 are coupled to the BB modem 110. These ADCs are coupled to an Rx path, wherein both the Rx path and Tx path are coupled to an antenna network 160 which includes external matching components and an NFC antenna 130. The Rx path consists of a series of high and low pass filters coupled between a multiplier and a programmable-gain amplifier. The TX path consists of Modulator and PA Driver 190 that transmits the signal to the antenna via the external matching network. The IC 100 further comprises a crystal oscillator 120, coupled to a MUX 125, the output of which is coupled to a load modulator 140, which is in turn coupled across the NFC antenna 130. The output of the MUX 125 is inputted to a Modulator and PA driver 190, which receives data to be transmitted from the BB modem 110 and provides the data to the antenna network 160. The load modulator 140 is also coupled to an RF limiter 145, an incoming field detector 155, a full wave rectifier (FWR) 165, and a regulator 170. Finally, a clock recovery circuit 175 and a field detector 180 are coupled to the antenna network 160. Please note that other circuit elements are illustrated in FIG. 1 for completeness, but are not essential to the method of the present invention and have not been designated with a numeral. Those skilled in the art will be familiar with the particular operations of these circuit elements, and they are therefore not detailed herein.

Conventional testing methods for ICs such as that illustrated in FIG. 1 use an off-chip tester circuit (not shown) to generate the testing signals. A first signal is generated by the tester circuit and passed to the IC. The IC 100 modulates this first signal to generate a modulated first signal which is transmitted via the Tx path to the antenna 130. The antenna 130 then sends the modulated first signal back via the Rx path as a second modulated signal. The IC 100 demodulates the second modulated signal to generate a second signal, which is passed to the tester circuit. By comparing the first signal with the second signal, the tester circuit can determine whether the IC passes or fails.

The above method, however, is unable to test functionality of other blocks of the IC 100, such as the clock recovery circuit 175 and full wave rectifier 165, etc. Even though the Tx path and Rx path may function correctly, other functional blocks may be defective, which means the IC 100 will still not work as intended. Further, the prior art method requires an off-chip tester circuit for generating and comparing the first signal and second signal.

SUMMARY

A method for testing an Integrated Circuit (IC) with Near Field Communication (NFC) technology according to a first embodiment of the present invention comprises: utilizing a BB modem of the IC to generate a known data pattern; modulating the known data pattern to generate a modulated data pattern; sending the modulated data pattern on the transmitting path to an NFC antenna of the IC and utilizing the NFC antenna to loop the modulated data pattern back to the receiving path; demodulating the modulated data pattern; and determining if the data pattern on the transmitting path is the same as the data pattern on the receiving path. When the data pattern on the transmitting path is not the same as the data pattern on the receiving path, it is determined that the IC fails.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
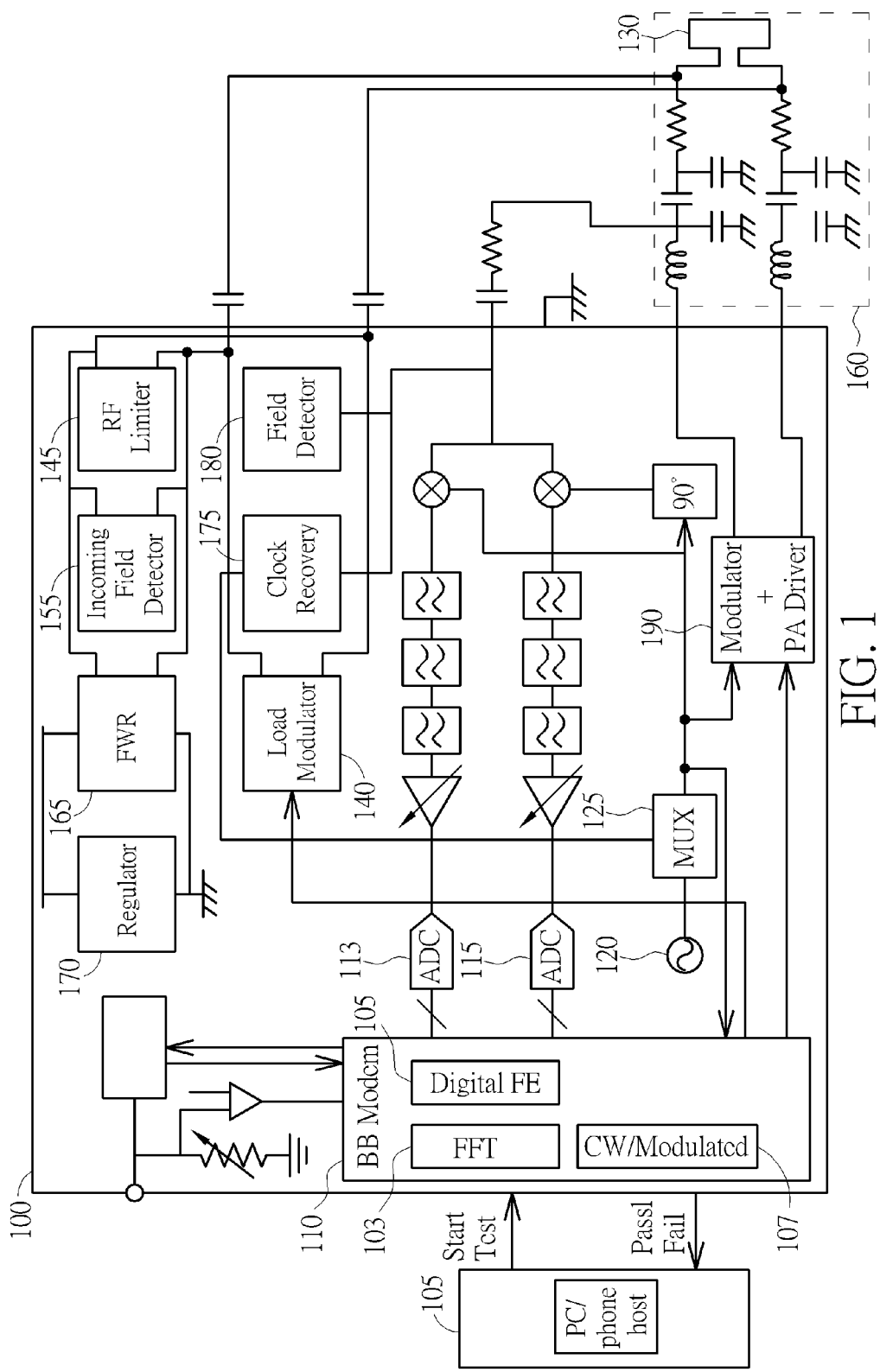
FIG. 1 is a diagram of an integrated circuit which uses Near Field Communication Technology.

In order to solve the problems associated with the prior art, the present invention provides exemplary testing methods for an IC 100, wherein the IC 100 performs a built-in self test (BIST). This removes the need for an off-chip tester circuit for providing testing signals. The prompt to start testing the IC 100 is initiated by the PC/phone host 150, as illustrated in FIG. 1. The pass/fail determination for the IC will also be judged by the PC/phone host 150. The exemplary methods of the present invention can further test the operation of other functional blocks within the IC 100.

The following will refer to two exemplary embodiments. Please note that both embodiments can be applied to the same IC 100 illustrated in FIG. 1, as the method of the present invention does not require any circuitry which is not already present in a conventional IC 100. Further, the two embodiments can be performed separately or combined, as will be obvious to one skilled in the art.

Embodiment 1

This first embodiment is specifically for testing the functionality of the tag emulation feature (PICC) for the Tx path, and for testing the proximity coupling device (PCD) of both the Tx path and Rx path.

A phase locked loop (PLL) in the IC 100 (not shown) locks to the crystal oscillator 120, for generating an oscillating signal having a frequency of 27.12 MHz. This signal is then passed to a divide-by-2 circuit (not shown) for generating two individual clocks, each having a frequency of 13.56 MHz, which are passed to the Tx path and the Rx path. These local oscillation (LO) signals are used to synthesize the two paths. The PCD feature of the Tx path is enabled, and an electric field according to the LO signal is generated, allowing the Tx path to transmit data via the NFC antenna 130. Please note that the LO signal is in the form of a sine wave having a frequency of 13.56 MHz, but this sine wave will not carry any data. The tag emulation feature (PICC) of the Tx path is then enabled, which allows the IC 100 to perform auxiliary carrier load modulation.

The BB modem 110 then generates a known data pattern which is passed to the load modulator 140. The enabling of the PICC feature allows the load modulator 140 to perform modulation on this known data pattern. The resultant modulated signal is output to the antenna network 160 and looped back to the Rx path of the IC 100 via the NFC antenna 130, and then demodulated. The data pattern on the Tx path is compared with the demodulated signal. If the two data patterns are the same, then not only are the Tx and Rx paths both confirmed to be functioning correctly, but functionality of the Load Modulator 140 can also be confirmed.

Please note that confirmation of functionality of the IC 100 by the PC/phone host 150 will only be 'pass' or 'fail', and no decision making circuitry or special software is required.

Figure 2:
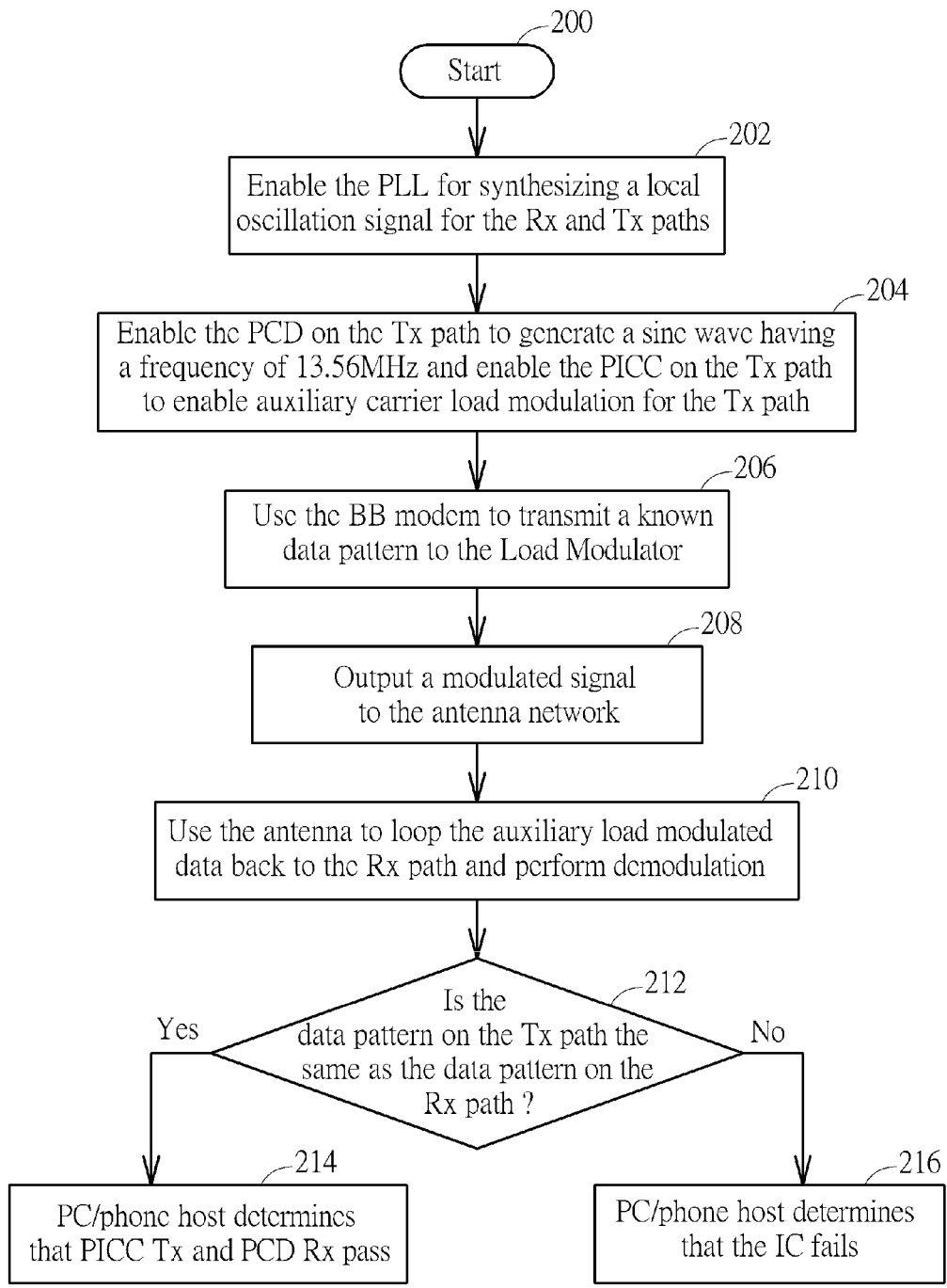
FIG. 2 is a flowchart detailing the steps of a method according to a first exemplary embodiment of the present invention.

Please refer to FIG. 2, which illustrates a flowchart of the above method. The steps of the method are as follows:

Step 200: Start;

Step 202: Enable the PLL for synthesizing a local oscillation signal for the Rx and Tx paths;

Step 204: Enable the PCD on the Tx path to generate a sine wave having a frequency of 13.56 MHz and enable the PICC on the Tx path to enable auxiliary carrier load modulation for the Tx path;

Step 206: Use the BB modem to transmit a known data pattern to the Load Modulator;

Step 208: Output a modulated signal to the antenna network;

Step 210: Use the antenna to loop the auxiliary load modulated data back to the Rx path and perform demodulation;

Step 212: Is the data pattern on the Tx path the same as the data pattern on the Rx path? If yes, go to Step 214; if no, go to Step 216;

Step 214: PC/phone host determines that PICC Tx and PCD Rx pass;

Step 216: PC/phone host determines that the IC fails.

In the first embodiment, no data is transmitted along with the signal. Using the method of the first embodiment alone provides no guarantee that transmitted data can be transmitted with 100% accuracy. A second embodiment is therefore provided.

Embodiment 2

In the second embodiment, a known data pattern is transmitted by the Tx path and looped back to the Rx path in order to confirm that data can be successfully transmitted by the IC 100. The data pattern consists of two signals, wherein the first signal is all ONES and the second signal is all ZEROS. In this embodiment, the Power Harvest Circuitry of the IC 100, such as the clock recovery circuit, FWR and the Regulator, can also be verified.

Initially, as in the first embodiment, the crystal oscillator generates a clock at 27.12 MHz, which is divided by two. Unlike the first embodiment, however, this divided clock signal is sent straight to the modulator and PA driver 190 of the Tx path, and not sent to the Rx path. The PCD of the Tx path is then enabled to generate a sine wave having a frequency of 13.56 MHz, in response to the received clock signal.

Electric fields and a shunting current will therefore be present in the IC circuit 100. If the Power Harvest circuit elements (Regulator 170, FWR 165, Incoming Field Detector 155, and Field Detector 180) detect these electric fields and shunting current, it can be verified that they are operating correctly. The PC/phone host 150 therefore reads out status signals sent from each Power Harvest circuit element and provides a Pass/Fail judgment based on the status signals. Please note that this embodiment further tests for whether data can be successfully transmitted by the IC 100, but if any of the Power Harvest circuit elements fails the above test then the flow will not proceed to the data testing stage, as it is already confirmed that the IC 100 will not operate correctly.

The Regulator 170 and FWR 165 will provide a status signal confirming that an activated shunting current is detected, if both circuits are operating correctly. The Incoming Field Detector 155 will provide a status signal confirming that an ANT Field (low power wireless technology) is detected, if it is operating correctly. The Field Detector 180 will provide a status signal confirming that an RF field is detected, if it is operating correctly.

After confirmation of the functionality of the above elements, the modulated sine wave is sent to the Rx path by looping back through the NFC antenna 130. The clock recovery circuit 175 will lock to this modulated sine wave and recover the original signal so it can be provided to the Rx path. In this way, the functionality of the clock recovery circuit 175 can also be confirmed. The PICC function of the Rx path is then enabled.

The BB engine 110 generates a data signal of a known pattern and passes this data signal directly to the modulator and PA driver 190. The data pattern is modulated, passed to the antenna network 160, and looped back to the Rx path via the NFC antenna 130. The activated PICC of the Rx path can then demodulate the signal to regain the original data pattern, and compare it with the signal on the Tx path for determining whether the data patterns are the same. If they are the same, the IC 100 passes.

Figure 3:
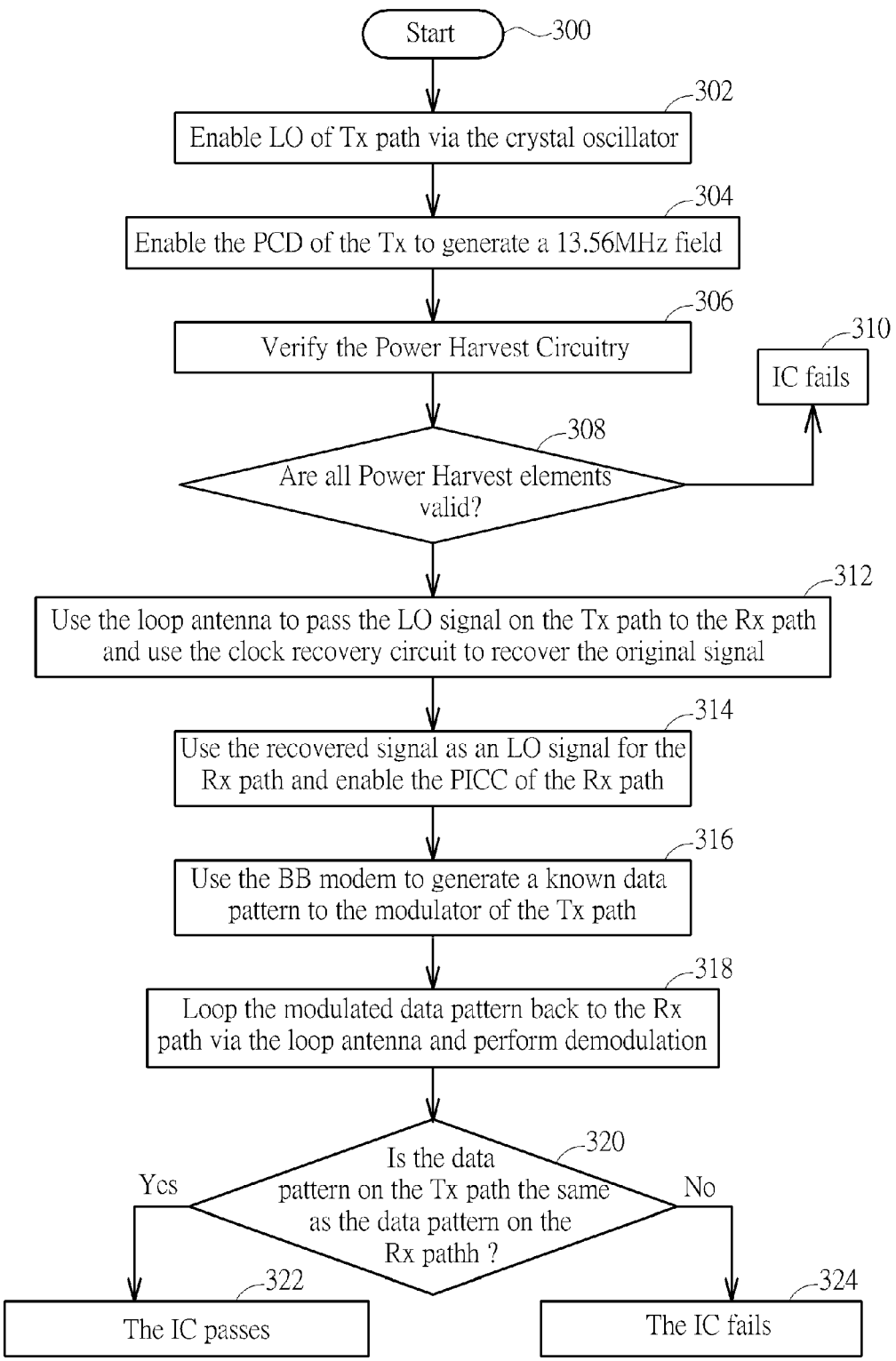
FIG. 3 is a flowchart detailing the steps of a method according to a first exemplary embodiment of the present invention.

The above method is illustrated in FIG. 3, the steps of which are detailed as follows.

Step 300: Start;

Step 302: Enable LO of Tx path via the crystal oscillator;

Step 304: Enable the PCD of the Tx to generate a 13.56 MHz field;

Step 306: Verify the Power Harvest Circuitry;

Step 308: Are all Power Harvest elements valid? If yes, go to Step 213; if no, go to Step 310;

Step 310: IC fails;

Step 312: Use the loop antenna to pass the LO signal on the Tx path to the Rx path and use the clock recovery circuit to recover the original signal;

Step 314: Use the recovered signal as an LO signal for the Rx path and enable the PICC of the Rx path;

Step 316: Use the BB modem to generate a known data pattern to the modulator of the Tx path;

Step 318: Loop the modulated data pattern back to the Rx path via the loop antenna and perform demodulation;

Step 320: Is the data pattern on the Tx path the same as the data pattern on the Rx path? If yes, go to Step 322; if no, go to Step 324;

Step 322: The IC passes;

Step 324: The IC fails.

As detailed in the above, by performing an RBIST, the IC 100 can confirm functionality of the Tx and Rx paths, the Power Harvest elements, and both PICC and PCD features of the IC 100, without the need for any extra circuitry or an external testing circuit. Thus, not only are the testing methods of the present invention cheaper and simpler to implement than conventional methods, but they also can test the operation of various functional elements which cannot be tested by conventional methods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for testing an Integrated Circuit (IC) with Near Field Communication (NFC) technology, the method comprising:
    generating a local oscillation signal to at least a transmitting path of the IC;
    generating the local oscillation signal to the receiving path for synchronizing the transmitting path and a receiving path of the IC;
    utilizing a BB modem of the IC to generate a known data pattern;
    modulating the known data pattern to generate a modulated data pattern, wherein the modulation is auxiliary carrier load modulation;
    sending the modulated data pattern on the transmitting path to an NFC antenna of the IC and utilizing the NFC antenna to loop the modulated data pattern back to the receiving path;
    demodulating the modulated data pattern; and
    determining if the data pattern on the transmitting path is the same as the data pattern on the receiving path;
    wherein it is determined that the IC fails when the data pattern on the transmitting path is not the same as the data pattern on the receiving path.

2. The method of claim 1, wherein when the local oscillation signal is generated to the transmitting path, a proximity coupling mode of the transmitting path is enabled to generate an electric field according to the local oscillation signal for enabling transmission of the known data pattern.

3. A method for testing an Integrated Circuit (IC) with Near Field Communication (NFC) technology, wherein the IC comprises a plurality of power harvest circuits, the method comprising:
    generating a local oscillation signal to at least a transmitting path of the IC;
    utilizing a BB modem of the IC to generate a known data pattern;
    modulating the known data pattern to generate a modulated data pattern;
    enabling a proximity coupling mode of the transmitting path to generate an electric field according to the local oscillation signal, wherein the generated electric field stimulates at least a radio frequency (RF) field, an antenna field, and a shunting current of the IC;
    determining if the power harvest circuits detect the RF field, the antenna field, and the shunting current; and
    when at least one of the RF field, the antenna field, and the shunting current is not detected by the power harvest circuits, the IC is determined to fail.

4. The method of claim 3, wherein when the RF field, the antenna field and the shunting current are detected by the power harvest circuits, the method further comprises:
    sending the modulated data pattern on the transmitting path to an NFC antenna of the IC and utilizing the NFC antenna to loop the modulated data pattern back to a receiving path of the IC;
    demodulating the modulated data pattern; and
    determining if the data pattern on the transmitting path is the same as the data pattern on the receiving path;
    wherein it is determined that the IC fails when the data pattern on the transmitting path is not the same as the data pattern on the receiving path.

5. The method of claim 4, further comprising:
    utilizing the antenna to recover a carrier wave of the generated electric field;
    utilizing the recovered carrier wave to enable a local oscillation signal of the receiving path; and
    enabling a tag emulation mode of the receiving path.

6. A method for testing an Integrated Circuit (IC) having a transmitting path and a receiving path, the method comprising:
    generating a single tone signal;
    after generating the single tone signal, utilizing a BB modem of the IC to generate a known data pattern;
    modulating the known data pattern to generate a modulated data pattern, wherein the modulation is auxiliary carrier load modulation;
    sending the modulated data pattern on the transmitting path of the IC to an antenna and utilizing the antenna to loop the modulated data pattern back to the receiving path of the IC;
    demodulating the modulated data pattern; and
    determining if the data pattern on the transmitting path is substantially identical to the data pattern on the receiving path;
    wherein it is determined that the IC fails when the data pattern on the transmitting path is not substantially identical to the data pattern on the receiving path.

* * * * *